(12) United States Patent
Seresht et al.

(10) Patent No.: US 12,266,079 B2
(45) Date of Patent: Apr. 1, 2025

(54) SEMANTICALLY ACCURATE SUPER-RESOLUTION GENERATIVE ADVERSARIAL NETWORKS

(71) Applicant: Nearmap Australia Pty Ltd., Barangaroo (AU)

(72) Inventors: Nagita Mehr Seresht, West Pennant Hills (AU); Tristan Frizza, Barangaroo (AU); Michael Bewley, Barangaroo (AU)

(73) Assignee: NEARMAP AUSTRALIA PTY LTD., Barangaroo (AU)

( * ) Notice: Subject to any disclaimer, the term of this patent is extended or adjusted under 35 U.S.C. 154(b) by 419 days.

(21) Appl. No.: 17/717,824

(22) Filed: Apr. 11, 2022

(65) Prior Publication Data

US 2022/0335572 A1 Oct. 20, 2022

Related U.S. Application Data

(60) Provisional application No. 63/173,536, filed on Apr. 12, 2021.

(51) Int. Cl.
*G06T 3/4053* (2024.01)
*G06N 3/04* (2023.01)
*G06T 3/4046* (2024.01)
*G06T 7/11* (2017.01)

(52) U.S. Cl.
CPC ............ *G06T 3/4053* (2013.01); *G06N 3/04* (2013.01); *G06T 3/4046* (2013.01); *G06T 7/11* (2017.01); *G06T 2207/10032* (2013.01); *G06T 2207/20084* (2013.01)

(58) Field of Classification Search
CPC ....... G06T 3/4053; G06T 3/4046; G06T 7/11; G06T 2207/10032; G06T 2207/20084; G06T 5/20; G06T 2207/20172; G06N 3/04; G06N 3/0475; G06N 3/09; G06N 3/094;
(Continued)

(56) References Cited

U.S. PATENT DOCUMENTS

2021/0125313 A1* 4/2021 Bai .................. G06V 10/806
2021/0256707 A1* 8/2021 Brown ............. G06V 10/764
(Continued)

FOREIGN PATENT DOCUMENTS

| CN | 110909744 A | 3/2020 |
|----|-------------|--------|
| CN | 111709878 A | 9/2020 |
| CN | 109996073 B | 11/2020 |

OTHER PUBLICATIONS

International Search Report and Written Opinion issued Aug. 16, 2022, in PCT/IB2022/000207, 11 pages.
(Continued)

*Primary Examiner* — Molly Wilburn
(74) *Attorney, Agent, or Firm* — XSENSUS LLP

(57) ABSTRACT

An image processing system includes circuitry that generates up-sampled images corresponding to input images based on the input images, image realism prediction values, and a corresponding semantic feature mask. The circuitry generates the image realism prediction values based on at least one of the input images and the up-sampled images, and generates the semantic feature mask based on at least one of the input images and the up-sampled images.

13 Claims, 6 Drawing Sheets

(58) Field of Classification Search
CPC ...... G06N 3/0464; G06N 3/084; G06V 10/44; G06V 10/82
See application file for complete search history.

(56) References Cited

U.S. PATENT DOCUMENTS

2021/0353393 A1* 11/2021 Kearney ............... G16H 50/30
2021/0358123 A1* 11/2021 Kearney ............... G16H 30/40

OTHER PUBLICATIONS

Wang, X, et al., "ESRGAN: Enhanced super-resolution generative adversarial networks", Proceedings of the European conference on computer vision (ECCV) workshops, 2018, pp. 1-16.

Deng, X, et al., "What is it like down there? Generating dense ground-level views and image features from overhead imagery using conditional generative adversarial networks", Proceedings of the 26th ACM Sigspatial International Conference on Advances in Geographic Information Systems, 2018, pp. 43-52.

Zhai, M., et al., "Predicting ground-level scene layout from aerial imagery", In Proceedings of the IEEE Conference on Computer Vision and Pattern Recognition, 2017, pp. 867-875.

Bühler Marcel Christoph et al.: "DeepSEE: Deep Disentangled Semantic Explorative Extreme Super-Resolution"; In: "ArXiv", Apr. 9, 2020 (Apr. 9, 2020), XP055836662, pp. 1-46 (46 pages).

Wang Xintao et al.: "ESRGAN: Enhanced Super-Resolution Generative Adversarial Networks", Jan. 23, 2019 (Jan. 23, 2019), Advances in Databases and Information Systems; [Lecture Notes in Computer Science; Lect.Notes Computer], Springer International Publishing, Cham, pp. 63-79, XP047501241, ISBN: 978-3-319-10403-4 [retrieved on Jan. 23, 2019] (17 pages).

Park T et al.: "Semantic_Image_Synthesis_With_Spatially-Adaptive_Normalization", CVPR 2019, Jan. 1, 2019 (Jan. 1, 2019), pp. 2337-2346, XP093160513, Retrieved from the Internet: URL:https://openaccess.thecvf.com/content_CVPR_2019/papers/Park_Semantic_Image_Synthesis_With_Spatially-Adaptive_Normalization_CVPR_2019_paper.pdf [retrieved on Jan. 20, 2025] (10 pages).

Extended European Search Report for European Application No. EP22787695 mailed Jan. 31, 2025 (9 pages).

* cited by examiner

SEMANTICALLY ACCURATE SUPER-RESOLUTION GENERATIVE ADVERSARIAL NETWORKS

CROSS-REFERENCE TO RELATED APPLICATIONS

This application claims the benefit of priority to U.S. Provisional Application No. 63/173,536, filed Apr. 12, 2021 and titled "Semantically Accurate Super-Resolution Generative Adversarial Networks," the entire contents of which are incorporated herein by reference.

BACKGROUND

This application is related to an apparatus and associated methodology for upsampling aerial imagery. Specifically, the application relates to use of Generative Adversarial Networks (GANS) for upsampling aerial imagery.

Image super-resolution is utilized to increase the effective resolution of images in an imaging system. Additionally, super-resolution can be used to increase the sharpness of images in remote sensing. For example, in a multi-camera photogrammetry imaging system, super-resolution can be used to increase the resolution of the overhead camera (which typically has a lower resolution) closer to the resolution of the high resolution cameras in the system. However, images generated by the system may have missing or blurry sections due to artifacts in the initial images provided to the system. For example, in the case of aerial images, the artifacts in the initial images may be due to unexpected movement of the aircraft capturing the images (from turbulence, pilot error, etc.).

While it is possible to use the images with the missing or blurry sections, there is a need to replace the missing or blurry sections of the images with imagery of the same resolution of the images. To that end, conventional systems attempt to upsample imagery in order to fill in the missing or blurry sections, but thus far those conventional systems produce results that are not semantically faithful. This, in turn, reduces the accuracy of the resulting images. Moreover, conventional systems often require complex learning algorithms that require intensive computation and still result in a suboptimal solution.

Accordingly, a need still exists for a way of replacing sections of imagery that are either missing or blurry with sections of the same resolution as the rest of the imagery without losing semantical fidelity.

SUMMARY

In exemplary aspects, an image processing system includes circuitry that generates up-sampled images corresponding to input images based on the input images, image realism prediction values, and a corresponding semantic feature mask. The circuitry generates the image realism prediction values based on at least one of the input images and the up-sampled images, and generates the semantic feature mask based on at least one of the input images and the up-sampled images.

In exemplary aspects, the circuitry also detects at least a portion of the images requiring up-sampling when the portion of the images has a lower resolution than a resolution of surrounding images.

In exemplary aspects, the circuitry generates the up-sampled images using a trained residual-in-residual dense network (RRDN).

In exemplary aspects, the circuitry generates the realism prediction values using a generative adversarial network (GAN) discriminator.

In exemplary aspects, the input images correspond to aerial images of geographic locations.

In exemplary aspects, the GAN discriminator includes a plurality of convolution layers to process the input images and generate the realism prediction values.

In exemplary aspects, the plurality of convolution layers of the GAN discriminator compare the input images to the up-sampled images to generate the realism prediction values.

In exemplary aspects, a system for generating overhead aerial imagery includes the image processing system and one or more cameras to take aerial images of geographic locations.

In exemplary aspects, an image processing method includes generating up-sampled images corresponding to input images based on the input images, image realism prediction values, and a corresponding semantic feature mask, generating the image realism prediction values based on at least one of the input images and the up-sampled images, and generating the semantic feature mask based on at least one of the input images and the up-sampled images.

In exemplary aspects, the image processing method also includes detecting at least a portfolio of the images requiring up-sampling when the portion of the images has a lower resolution than a resolution of surrounding images.

In exemplary aspects, the image processing method also includes generating the up-sampled images using a trained residual-in-residual dense network (RRDN).

In exemplary aspects, the image processing method also includes generating the realism prediction values using a generative adversarial network (GAN) discriminator.

In exemplary aspects, a non-transitory computer-readable medium stores instructions which when executed by a processor cause the processor to perform a method, which includes generating up-sampled images corresponding to input images based on the input images, image realism prediction values, and a corresponding semantic feature mask, generating the image realism prediction values based on at least one of the input images and the up-sampled images, and generating the semantic feature mask based on at least one of the input images and the up-sampled images.

In exemplary aspects, the non-transitory computer-readable medium stores instructions which cause the processor to perform the method, that also includes detecting at least a portion of the images requiring up-sampling when the portion of the images has a lower resolution than a resolution of surrounding images.

In exemplary aspects, the non-transitory computer-readable medium stores instructions which cause the processor to perform the method, that also includes generating the up-sampled images using a trained residual-in-residual dense network (RRDN).

In exemplary aspects, the non-transitory computer-readable medium stores instructions which cause the processor to perform the method, that also includes generating the realism prediction values using a generative adversarial network (GAN) discriminator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
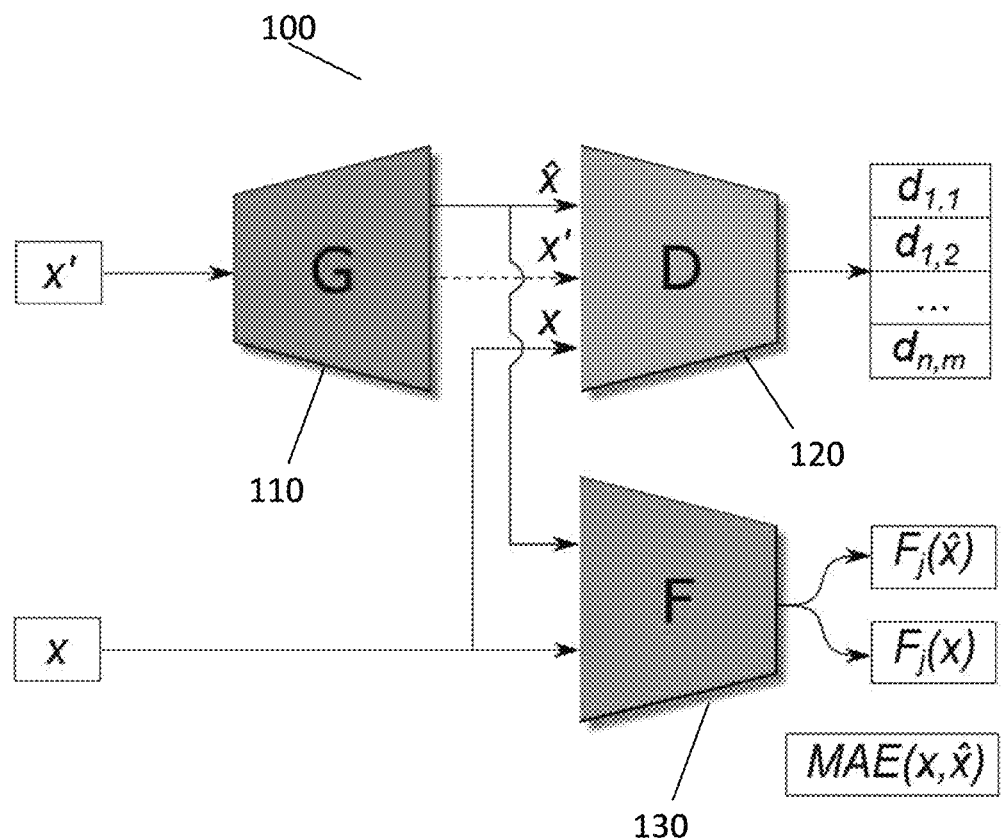
FIG. 1 is a block diagram of the architecture of an image processing system to train a generator according to exemplary aspects of the present disclosure.

Referring now to the drawings, wherein like reference numerals designate identical or corresponding parts throughout the several views, FIG. 1 is a block diagram of the architecture of an image processing system to train a generator according to exemplary aspects of the present disclosure. In FIG. 1, a high-level network architecture 100 includes a generator 110, a discriminator 120, and a semantic feature mask generator 130.

The discriminator 120 is used while training the generator 110. As shown in FIG. 1, a low-resolution counterpart x' is an input to the generator 110 which outputs upsampled images x̂. The upsampled images x̂ are fed into the discriminator 120 along with the low-resolution counterpart x' and high-resolution training images x. The original low resolution image x' is used in the discriminator D (during training) to generate the nearest neighbored upsampled image $x_{nn}$. The discriminator 120 outputs the realism of image patches $d_{i,j}$. The upsampled images x̂ are fed into the resulting semantic feature mask generator 130 with the high-resolution training images x. The resulting semantic feature mask generator 130 outputs loss value F. After the training, there is no need to feed the upsampled images x̂ to the discriminator D.

The generator 110 may include a Residual-in-residual Dense Network (RRDN) architecture with three dense blocks. Of course, an RRDN with fewer than three dense blocks or more than three dense blocks can also be used as the generator 110 without departing from the scope of the present disclosure. The discriminator 120 includes a patch-based discriminator which outputs predictions over individual "patches" of the input image. Patch can be a small piece of an image; for example a 3×3 patch is a patch containing 9 pixels of a larger image. As one of ordinary skill will recognize, patches that are larger than 3×3, or smaller than 3×3 can also be used without departing from the scope of the present disclosure. In some exemplary aspect, a patch can also be the entire image.

The patch-based discriminator allows a network to be fully convolutional and hence can process any arbitrarily sized input image. Moreover, having a Lipschitz-continuity and finitely bounded gradients in the discriminator 120 makes the generator 110 avoid spikes in the backpropagation signal and less likely to destabilize, which leads to improve the training stability of GANs. This is because Lipschitz-continuity assures the boundedness of statistics, which gives some outputs corresponding to any inputs within the Lipschitz-continuity. The discriminator 120 generates the probability of its input being an upsampled image (as opposed to a true high resolution image). A discriminative loss is then calculated comparing the output of the discriminator with the true-labels and the gradient of this loss is used to train the generator 110. The Lipschitz-continuity refers to the gradient of such loss value. Next, a domain-specific image segmentation network pre-trained is used to predict semantic masks over aerial imagery for classes such as cars, roads, vegetation, roofs, solar panels, and so on. The network is used in parallel with the discriminator 110 to judge image loss. However, the network focuses on the reconstruction of semantic image features by comparing the semantic segmentation of the original image to the super-resolved prediction during the training of the generator 110. By using the segmentation predictions before thresholding for a probabilistic interpretation, a super-resolution network is imbued with specific knowledge of the domain learned separately by the segmentation network. This results in the reconstruction of image features that are semantically correct with respect to the image segmentation.

The generator 110 learns to create upsampled images x̂ based on three signals: pixel-space comparison to high-resolution training images x via Mean Absolute Error, feedback from the discriminator 120 which predicts the realism of image patches $d_{i,j}$, and quality of the resulting semantic feature masks. In super-resolution, an information-dense high-resolution image is estimated from a lower-information source image, which leads to the ambiguous situation in which one source may have multiple candidate high-resolution solutions. When training the generator 110, a low-resolution counterpart x' can be derived from an original high-resolution image x by using a bilinear down-sampling operation with antialiasing via a filter applied to remove high-frequency sampling artefacts. The filter can be, for example, a Gaussian blur filter as one of ordinary skill will recognize. However, other filters are possible without departing from the scope of the present disclosure. Then, a neural network function G(x') approximating the inverse transform from low to high-dimensional image space is trained. By comparing the generated high-resolution estimation of an algorithm to the original image, a loss score can be calculated and gradient descent optimization to minimize the loss score can be estimated.

Figure 2:
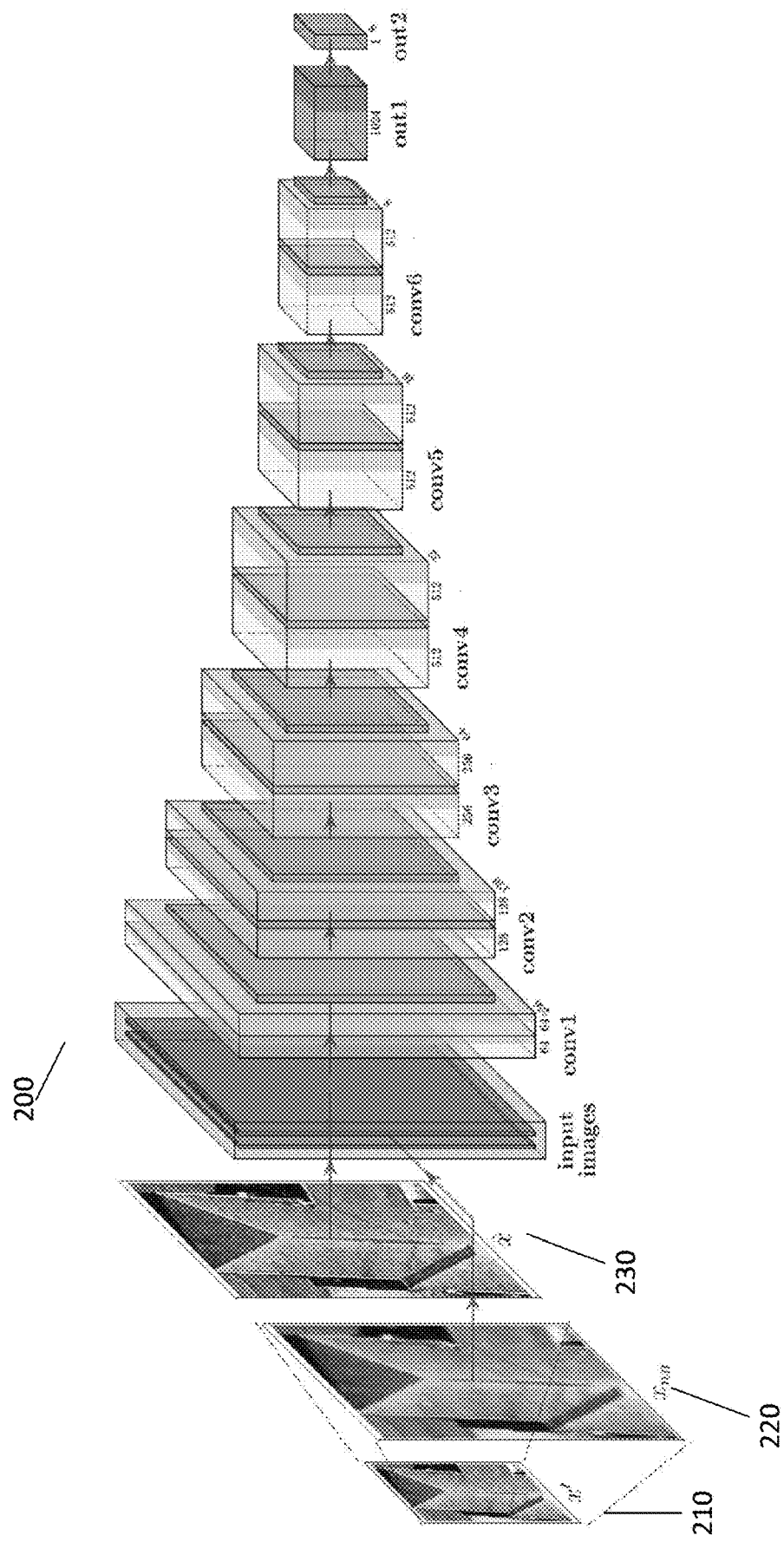
FIG. 2 is a block diagram of the architecture of a discriminator of the image processing system according to exemplary aspects of the present disclosure.

FIG. 2 is a block diagram of the architecture of a discriminator 120 of the image processing system according to exemplary aspects of the present disclosure. The discriminator includes a conditional patch-based discriminator network architecture 200 that can predict realness of images, conditioned on a nearest-neighbor upsample of the low-resolution input image. The realness of an image is a measure of how closely an appearance of an object depicted in the image matches the appearance of the object itself. The low resolution image 210 is nearest-neighbor upsampled to produce 220 and then concatenated to the generator prediction 230. The architecture changes the discriminator objective from predicting realistic standalone images to predicting realistic transformation of given low resolution images with respect to the original source images. Additionally, conditioning the discriminator 120 on input images aides in obtaining desired pixel accuracy and intersection over union (IoU) scores by penalizing generator models with large mismatches between inputs and outputs. The term IoU is also referred as a the Jaccard Index, which compares a predicted segmentation mask against a target mask by taking the ratio of overlapped areas over the union of the two. This architecture can mitigate GAN collapse during training in which the generator can fall into a uni-modal state, producing identical outputs regardless of inputs. By maintaining relevance between the inputs and outputs, the model can effectively overcome excessing and unwarranted hallucination of unrealistic detail at higher upsampling factors. The convolutional blocks indicate two sets of stacked 3×3 convolution and Batch Norm layers whereas out blocks are single 1×1 convolutions. As one of ordinary skill will recognize other sets of convolutional blocks and/or other sizes of convolutional blocks are also possible without departing from the scope of the present disclosure.

Generally, either the sections that need up-sampling are detected as those sections are filled up from the image captured, or the super-resolution upsampling process is applied to the whole image. For instance, the super-resolution upsampling process is applied to bring an image with the resolution of 16 cm per pixel to look similar to an image with the resolution of 4 cm per pixel. As one of ordinary skill will recognize application of other size of the resolution are also possible without departing from the scope of the present disclosure.

The loss between two images may be formulated as performing a pixel-wise operation such as taking the mean squared error (MSE) or mean absolute error (MAE) across all pixels of the respective images. For the sake of brevity, we use MAE in the discussion below, but this is merely exemplary and not limiting upon the present disclosure. The MSE, or other error functions may also be used without limitation.

$$\mathcal{L}_{MAE} = \frac{1}{HWC}\|x - \hat{x}\|_1 \tag{1}$$

In the equation (1), H, W, C are the height, width, and channel dimensions of the image, respectively, and $\hat{x}=G(x')$ is the generator prediction based on the downsampled input image x'. While pixel-wise loss functions such as this one compute the average loss over all pixels, models learn to reconstruct images by minimizing their average error and thus produce blurry features that are correct on average. However, this reconstruction masks small-scale variation and detail in generated images, which are details required for super-resolution applications. Therefore, two additional loss terms are employed: a semantic feature loss and a GAN loss.

Feature loss incorporates the reconstruction of semantic image features by adding a loss term derived from the intermediate activations of an auxiliary classifier network. An auxiliary classifier network receives two images, and if both images have similar semantic content then the classifier activations should be activated similarly. This is then applied into semantic segmentation networks that produce a spatial mask. The feature loss is applied to train the model to reconstruct important semantic features such as roofing material, roads, and the like.

$$\mathcal{L}_{feat}^{F,j} = \frac{1}{H_j W_j C_j}\|F_j(x) - F_j(\hat{x})\|_2^2 \tag{2}$$

The feature reconstruction loss $\mathcal{L}_{feat}^{F,j}$ the squared and normalized Euclidean distance between feature representations in a feature map of shape $C_j \times H_j \times W_j$ for several layers j from the semantic feature mask generator 130.

With regard to the GAN loss, the binary cross-entropy loss across predictions on patches of the image is calculated. In addition, the discriminator 110 is conditioned on the low-resolution input image, so that the discriminator 110 learns not just whether a given high-resolution image is "realistic," but also whether it is a realistic super-resolution of a given low-resolution image. The discrimination uses the nearest-neighbor upsampling of the low-resolution image to generate $x_{nn}$(220).

$$\mathcal{L}_G{}^{GAN} = -\mathbb{E}_{\hat{x} \sim p_g}[\log(D(\hat{x}))] \tag{3}$$

$$\mathcal{L}_D = -\mathbb{E}_{x \sim p_d}[\log(D(x|x_{nn}))] - \mathbb{E}_{\hat{x} \sim p_g}[\log(1-D(\hat{x}|x_{nn}))] \tag{4}$$

In equations (3) and (4), $\mathbb{E}$ is the expected value. Specifically, $\mathbb{E}_{\hat{x} \sim p_g}$ is the expected value (of the log of the discriminator value) over all super-resolved images generated by the generator 110. $\mathbb{E}_{x \sim p_d}$ is the expected value over all the original high resolution images x.

Combining three equations (2)-(4) gives the final weighted loss function. By using $\alpha=1\times10^{-3}$, $\beta=5$, and $\gamma=1\times10^{-3}$ as respective loss weighting hyperparameters, a respectable balance between imagined detail and true semantic reconstruction is achieved.

$$\mathcal{L}_G = \alpha \mathcal{L}_G{}^{GAN} + \beta \mathcal{L}_{feat} + \gamma \mathcal{L}_{L1} \tag{5}$$

In equation (5), the feature construction loss $\mathcal{L}_{feat}^{F,j}$ augments the GAN loss.

For evaluation, three full-reference image metrics are chosen. First, the peak signal-to-noise ratio (PSNR), is a measure of the maximum pixel intensity to the power of corrupting noise or distortion.

$$PSNR = 10 \cdot \log_{10}\left(\frac{MAX_I^2}{MSE}\right) \tag{6}$$

In equation (6), $MAX_I$ is the maximum pixel intensity in the image and MSE is the mean-squared error over pixels.

Second, the structural similarity index (SSIM), aims to judge local structure of the image after normalizing for luminance and contrast. SSIM is also regarded as agreeing more closely with subjective perception as the human visual system is adept at identifying structural composition in images.

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \tag{7}$$

In equation (7), μ and σ are the mean and standard deviation of their respective images and $c_1$ and $c_2$ are constants proportional to the dynamic range of the give images, used to stabilize the division operation.

Additionally, the multi-scale structural similarity index (MS-SSIM), extends SSIM to be evaluated as a weighted average at various downsampled resolutions.

Third, the IoU, compares a predicted segmentation mask against a target mask by taking the ratio of overlapped areas over the union of the two.

$$IoU(A, B) = \frac{|A \cap B|}{|A \cup B|} \tag{8}$$

To improve segmentation accuracy over a multi-class dataset, performance is reported as the class-wise mean intersection over union (mIoU), which is simply the IoU score averaged across each label class.

The improvement of matrices over baselines is reported as the percentage improvement, defined conventionally as follows.

$$\% \text{Improvement}(A, B) = \frac{A - B}{B} \cdot 100 \quad (9)$$

In equation (9), A is the result from the algorithm and B is the result of the baseline model.

Figure 3:
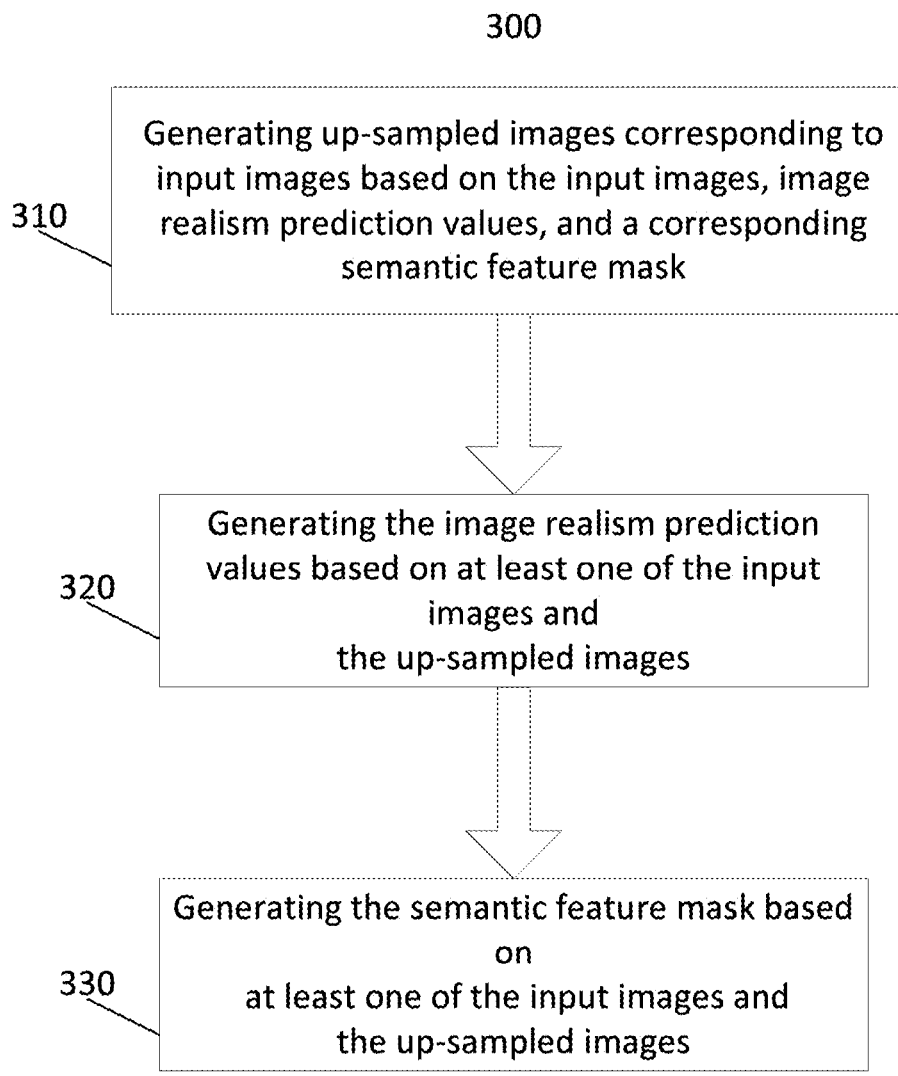
FIG. 3 is an algorithmic flowchart of a method performed by the image processing system according to exemplary aspects of the present disclosure.

Next, FIG. 3 illustrates an algorithmic flowchart of a method performed by the image processing system according to exemplary aspects of the present disclosure. The hardware description, exemplified by any one of the structure examples shown in FIGS. 5 and 6, includes specialized corresponding structure that is programmed or configured to perform the algorithm shown in FIG. 3. For example, the algorithm shown in FIG. 3 may be completely performed by the circuitry included in the single device shown in FIG. 5, or the algorithm may be completely performed in a shared manner distributed over the circuitry of any plurality of the devices shown in FIG. 6. The algorithm 300 has a plurality of steps. In step 310, up-sampled images corresponding to images are generated based on input images, image realism prediction values, and a corresponding semantic feature mask. Next, in step 320, the image realism prediction values are generated based on at least one of the input images and the up-sampled images. The step 320 is required when training the upsampling method of the step 310. Once the upsampling method is trained and deployed to a production system, the step 320 is not required for upsampling. In step 330, the semantic feature mask is generated based on at least one of the input images and the up-sampled images. Of course, FIG. 3 is just one example of a method according to the descriptions of the present disclosure, and other methods and algorithms are possible including those that omit one or more of the steps illustrated in FIG. 3, that include additional steps than those illustrated in FIG. 3, as one of ordinary skill would recognize.

Figure 4:
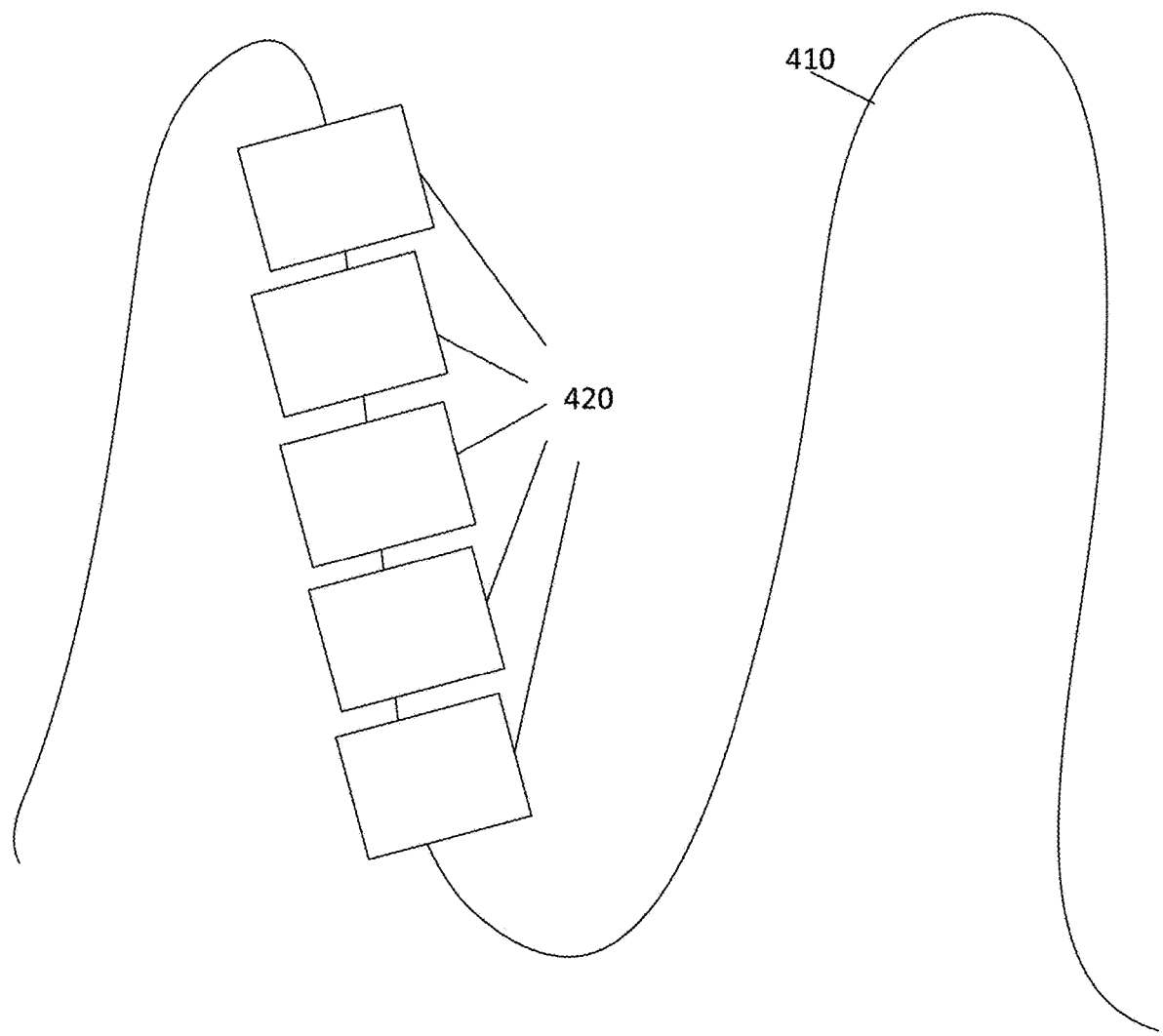
FIG. 4 is an example of a flight path of a vehicle while taking aerial images according to exemplary aspects of the present disclosure.

FIG. 4 illustrates an exemplary use of the concepts described in the present disclosure in obtaining aerial imagery. In FIG. 4, an exemplary flight path of an aircraft during aerial image capture is illustrated according to exemplary aspects of the present disclosure. For example, an airplane flies along a flight path 410 while taking pictures of aerial images 420. Of course, the aircraft does not just have to be an airplane, and can be other vehicles, such as drones, helicopters, satellites, and other devices/systems which can obtain aerial images. The aerial imagery may also be captured from other vantage points other than aircraft, such as from a boom affixed to a ground-based vehicle, from the top of a building, from a mountain top, etc. Thus, the specific method of capturing the aerial images is not limiting upon the present disclosure.

Returning to FIG. 4, the aircraft, while capturing images 420 as it flies along the flight path 410, may experience unexpected motion as a result of, for example, turbulence. In this case, the unexpected motion of the aircraft may cause one or more of the images 420 to be blurry and, in some cases, unusable. This gives rise to missing and/or blurry sections. Accordingly, the images 420 may be provided to a system that functions as described above in order to upsample and/or otherwise replace the blurry and/or unusable sections of the images 420 with sections that are sharp, semantically faithful, and of the same resolution as the rest of the images 420. Since the operation of such a system has been described above, further description is omitted for the sake of brevity.

Figure 5:
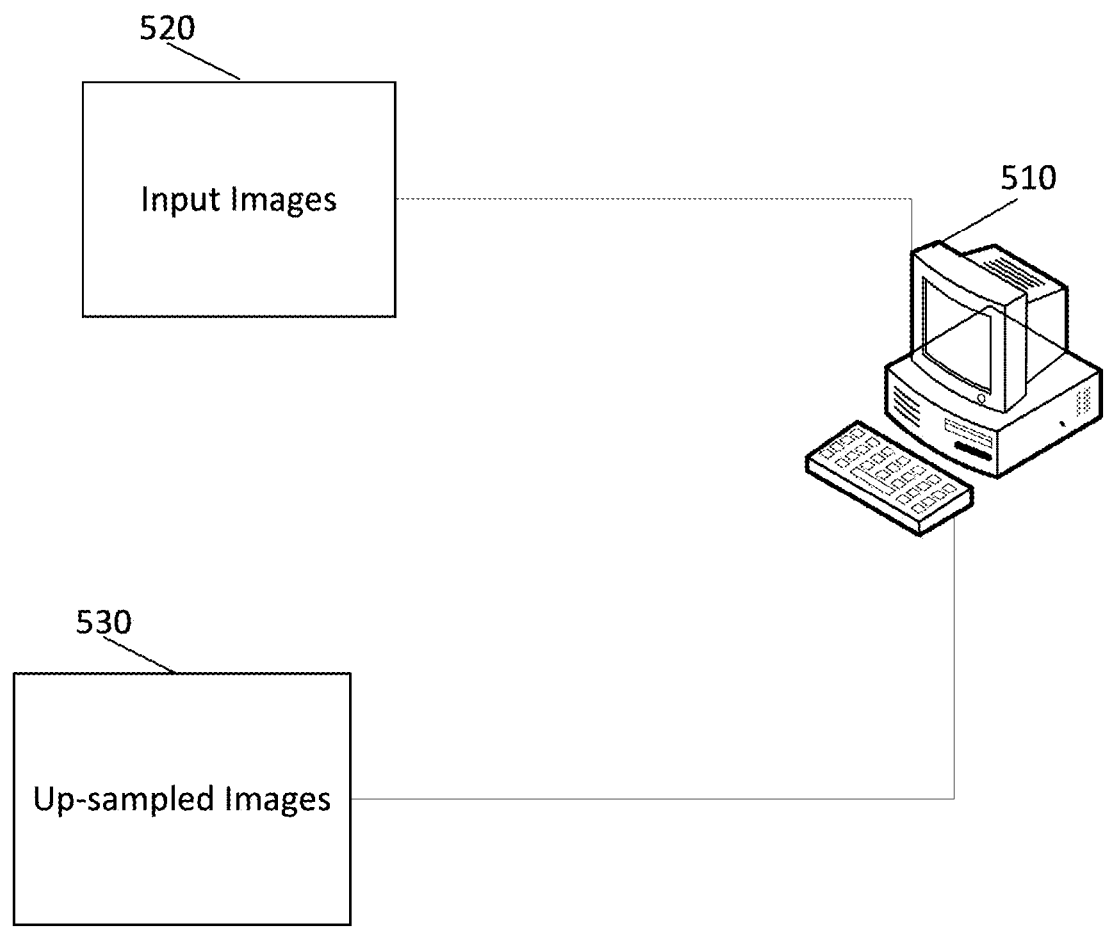
FIG. 5 is a system diagram of the image processing system according to exemplary aspects of the present disclosure.

FIG. 5 is a system diagram of the image processing system according to exemplary aspects of the present disclosure. A circuitry 510 obtains input images 520, which can be the images 420 from FIG. 4, and generates up-sampled images 530 based on super-resolution algorithm shown in FIG. 3.

The super-resolution algorithm in the circuitry 510 is trained on hardware. For example, a two-stage training procedure is applied to the hardware. The two-stage training procedure includes performing supervised pre-training of the generator with a MAE pixel-wise loss and fine-tuning with the discriminator network in an adversarial training set-up.

For the pre-training, the ADAM (a method for efficient stochastic optimization that only requires first-order gradients with little memory requirement) optimizer is used with a constant learning rate of $lr_g = 1 \times 10^{-4}$ and $lr_d = 2 \times 10^{-4}$ respectively. However, other optimization methods are possible without departing from the scope of the present disclosure. These learning rates are decayed by a factor of a half every 10,000 optimizer steps in order to allow the GAN to converge more reliably. For example, the algorithm is trained for between 10,000 and 40,000 iterations with more steps often being needed for the higher upsampling factors.

Further, training times can be sped up and overall performance can be improved by using the trained weights of lower upsampling factor models to serve as the initialization weights for higher ones. This is because super-resolution models can benefit from information learned at multiple different resolution scales.

In the training, a very large-scale dataset of close to half a million aerial images accompanied by human annotated feature masks can be used. For example, the dataset may cover imagery across Australia and the United States, captured at a ground spatial distance (GSD) resolution of 5-7 cm. In the training, labels for 34 unique categories of typical aerial image features, such as specific objects (swimming pool, solar panel) to materials (shining roof, tile roof) to general features (water body, shadow) can be used.

In training, it can be found that an RRDN with a traditional MAE (Mean Absolute Error) pixel loss generally greatly outperformed both the base bilinear algorithm as well as a GAN variant on the basis of image quality metrics.

TABLE 1

| Model | MAE Loss | PSNR (Peak Signal-to-Noise Ratio) | SSIM (Structural Similarity Index) | MS-SSIM (Multi-Scale Structural Similarity Index |
| --- | --- | --- | --- | --- |
| SRResNet (Super Resolution Residual Net) | 0.04066 | 25.44 | 0.6919 | 0.9296 |
| EDSR (Enhanced Deep Super-Resolution network) | 0.04059 | 25.45 | 0.6930 | 0.9301 |
| RRDN | 0.04035 | 25.51 | 0.6957 | 0.9308 |

It is also found that the super-resolution algorithm successfully enhances the resolution of the images, as well as excels in jointly improving the accuracy of semantic segmentations masks. Even when the downsampled imagery generates very poor semantic masks with significant false negatives, upon super-resolving, much greater success is achieved, with the GAN variant providing a significant improvement over leading generator-only CNN models (i.e. RRDN) due to its ability to augment finer detail and textural patterns.

As table 2 shows, the super-resolution algorithm greatly outperforms the state-of-the-art in CNN architectures (RRDS), with the performance margin widening drastically as the super resolution (i.e., upsampling) factor and the difficulty of the problem are increased. At the lower end of the scale, a small but not insignificant improvement of 11.8% in the mIoU of derived masks is observed. At these scales, low-resolution images still contain some useful information and texture. However, towards the more challenging end of the super-resolution spectrum, there are more blurry and uninformative low-resolution images, which may not provide enough information inherently present to perform any sort of accurate image segmentation. The GAN-based algorithm excels at capturing texture detail and is able to inject important features, which would improve IoU by 108.3% when increasing the resolution by a factor of 32 over RRDN.

TABLE 2

| Scale | Bilinear | CNN | GAN | % Improvement |
|---|---|---|---|---|
| 4× | 0.389 | 0.468 | 0.523 | 11.8 |
| 8× | 0.187 | 0.368 | 0.481 | 30.7 |
| 16× | 0.095 | 0.212 | 0.388 | 83.0 |
| 32× | 0.068 | 0.120 | 0.250 | 108.3 |

For an upsampling factor of 4, the GAN model improves on the results of RRDN in 27 out of 29 semantic categories. The categories that do not improve on see a minimal amount of regression, but the categories that most improve on see up to an 86.0% improvement.

The result shows that the GAN model provides the greatest impact to complex, multi-modal, high-detail and texture-rich scenes. For example, constructions sites are difficult category to accurately segment as each example is often highly variable and contains a great level of intricate details (construction beams, ladders, cranes). Boundaries of such sites are often difficult to define with absolute certainty.

It is also found that the GAN model outclass other approaches when resolving roof material (Tile Roof 52.0%, Shingle Roof 20.3%, and Metal Roof 14.4%) and vegetation (Very Low Vegetation 35.9% and Medium-High Vegetation 26.0%), both of which are highly texture dependent. For example, having the reconstruction driven by both pixel-level optimization as well as semantic fidelity allows it to infer that roofing of a particular shape and color is highly likely to have a corrugation pattern, a detail that might be very hard to identify judging by only the low-resolution pixels individually.

The GAN model also provides a less emphatic benefit to categories that are almost entirely defined by general shape and color, i.e., inherently lacking detail. For example, the GAN model can be applied to low-detail categories (Asphalt and Shadow which are both generally dark and featureless) as well as outline-oriented categories, such as roof shape (Dutch Gable, Gable, Hip Roofs).

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
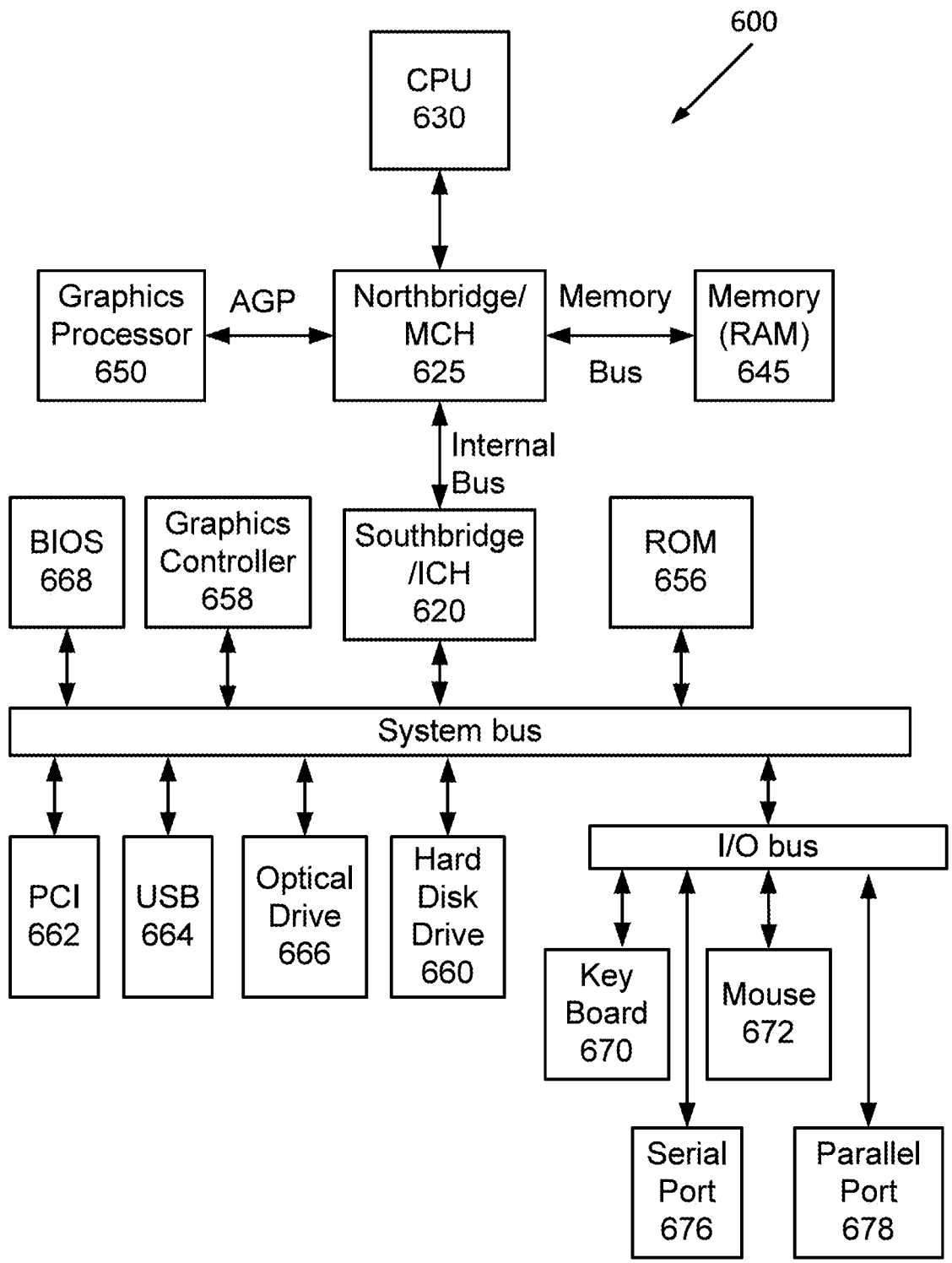
FIG. 6 is a schematic diagram of the hardware structure of an image processing system according to exemplary aspects of the present disclosure.

FIG. 6 is a schematic diagram of the hardware structure, i.e., circuitry, of an image processing system according to exemplary aspects of the present disclosure. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

In FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 620 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bust through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Obviously, numerous modifications and variations of the present invention are possible in light of the above teachings. It is therefore to be understood that within the scope of the appended claims, the invention may be practiced otherwise than as specifically described herein.

The invention claimed is:

1. An image processing system, comprising:
   circuitry configured to
   generate up-sampled images corresponding to input images based on the input images, image realism prediction values, and a corresponding semantic feature mask,
   generate the image realism prediction values based on at least one of the input images and the up-sampled images,
   generate the semantic feature mask based on at least one of the input images and the up-sampled images, and
   detect at least a portion of the images requiring up-sampling when the portion of the images has a lower resolution than a resolution of surrounding images.

2. The image processing system of claim 1, wherein the circuitry is configured to generate the up-sampled images using a trained residual-in-residual dense network (RRDN).

3. The image processing system of claim 1, wherein the circuitry is configured to generate the realism prediction values using a discriminator network.

4. The image processing system of claim 1, wherein the input images correspond to aerial images of geographic locations.

5. The image processing system according to claim 3, wherein the discriminator is a generative adversarial network (GAN) discriminator that includes a plurality of convolution layers to process the input images and generate the realism prediction values.

6. The image processing system according to claim 5, wherein the plurality of convolution layers of the GAN discriminator compare the input images to the up-sampled images to generate the realism prediction values.

7. A system for generating overhead aerial imagery, comprising:
    the image processing system according to claim 1; and
    one or more cameras to take aerial images of geographic locations.

8. An image processing method, comprising:
    generating up-sampled images corresponding to input images based on the input images, image realism prediction values, and a corresponding semantic feature mask;
    generating the image realism prediction values based on at least one of the input images and the up-sampled images;
    generating the semantic feature mask based on at least one of the input images and the up-sampled images; and
    detecting at least a portion of the images requiring up-sampling when the portion of the images has a lower resolution than a resolution of surrounding images.

9. The image processing method according to claim 8, further comprising generating the up-sampled images using a trained residual-in-residual dense network (RRDN).

10. The image processing method according to claim 8, further comprising generating the realism prediction values using a discriminator network.

11. A non-transitory computer-readable medium storing instructions which when executed by a processor cause the processor to perform a method, comprising:
    generating up-sampled images corresponding to input images based on the input images, image realism prediction values, and a corresponding semantic feature mask;
    generating the image realism prediction values based on at least one of the input images and the up-sampled images;
    generating the semantic feature mask based on at least one of the input images and the up-sampled images; and
    detecting at least a portion of the images requiring up-sampling when the portion of the images has a lower resolution than a resolution of surrounding images.

12. The non-transitory computer-readable medium according to claim 11, further comprising generating the up-sampled images using a trained residual-in-residual dense network (RRDN).

13. The non-transitory computer-readable medium according to claim 11, further comprising generating the realism prediction values using a discriminator network.

* * * * *